(12) United States Patent  (10) Patent No.: US 7,685,887 B2
Endres  (45) Date of Patent: Mar. 30, 2010

(54) AIR FLOW METER FOR AN AUTOMOBILE

(75) Inventor: Thomas Endres, Brighton, MI (US)

(73) Assignee: T&P Endres, LLC, Brighton, MI (US)

( * ) Notice: Subject to any disclaimer, the term of this patent is extended or adjusted under 35 U.S.C. 154(b) by 0 days.

(21) Appl. No.: 12/342,820

(22) Filed: Dec. 23, 2008

(65) Prior Publication Data

US 2009/0259415 A1  Oct. 15, 2009

Related U.S. Application Data

(63) Continuation-in-part of application No. 12/100,461, filed on Apr. 10, 2008, now Pat. No. 7,478,564.

(51) Int. Cl.
*G01F 1/56* (2006.01)
(52) U.S. Cl. .................................... 73/861.09
(58) Field of Classification Search .............. 73/861.09, 73/861.05, 118.2; 324/469, 464
See application file for complete search history.

(56) References Cited

U.S. PATENT DOCUMENTS 3,706,938 A * 12/1972 Petriw ........................ 324/459
4,019,383 A     4/1977 Wiegand, Jr. et al.
4,056,003 A * 11/1977 Zizine ..................... 73/861.09
4,387,602 A *  6/1983 Lao ......................... 73/861.09
4,393,719 A *  7/1983 Wiegand et al. .......... 73/861.05
4,953,407 A     9/1990 Malaczynski et al.

FOREIGN PATENT DOCUMENTS

EP     0058115 A1    8/1982

OTHER PUBLICATIONS

PCT Search Report dated Jun. 17, 2009.

* cited by examiner

*Primary Examiner*—Jewel Thompson
(74) *Attorney, Agent, or Firm*—Brinks Hofer Gilson & Lione

(57) ABSTRACT

An air flow meter includes a tube having an exterior surface and an interior surface, which defines an interior space. A collector is disposed within the interior space of the tube and a plurality of transmission pins protrude from the interior surface of the tube. The plurality of transmission pins are configured to create ions when a voltage from a high voltage power supply is applied to the plurality of transmission pins. The collector is configured to collect the ions created by the plurality of transmission pins and output a collector signal.

35 Claims, 8 Drawing Sheets

AIR FLOW METER FOR AN AUTOMOBILE

This application is a continuation-in-part application of U.S. patent application Ser. No. 12/100,461 filed Apr. 10, 2008, now U.S. Pat. No. 7,478,564, the entirety of which is hereby incorporated by reference.

BACKGROUND OF THE INVENTION

1. Field of the Invention

The invention relates to air flow meters and more particularly to ion drag air flow meters for automobile applications.

2. Description of the Known Technology

Automotive emission control systems often use an air flow meter to provide vital information relating to the amount of air drawn into an engine of an automobile. Typically, the air flow meter includes an element located in an interior chamber of the air flow meter. This element is an electrically conductive element that is heated as current flows through this element. As air flows across this element, the element cools and the electrical resistance changes. This change in resistance thus gives a signal that is proportional to the air flow.

However, air flow meters of this type, sometimes called "hot wire" air flow meters, have several drawbacks. Air flow meters of this type are not bi-directional. More specifically, air flow in either direction cools the element, thus changing the resistance. This change in resistance only indicates that the element has cooled and does not indicate which direction the air cooling the element is flowing. Second, these types of air flow meters have a relatively slow response time, generally in the order of fifteen milliseconds. Third, this type of air flow meter does not respond consistently to non-laminar air flow since the element only samples a portion of the air in the entire meter.

Another type of air flow meter is an ion drag air flow meter. This type of air flow meter uses a high voltage power supply to create a corona discharge by ionizing air around a highly curved surface, typically the tip of a needle. If the electrical gradient between this highly curved surface and a collection electrode is sufficient, electrons are released from the highly curved surface and collected by the collection electrode. Ions released by the highly curved surface travel towards the electrode. The travel of these ions is altered by air flow in the same space and as a result, the ions collected by the electrode provide a signal indicating the flow of air through the air meter.

Ion drag air flow meters have advantages over "hot wire" air flow meters in that ion drag air flow meters, if configured properly, can measure air flow in either direction. Additionally, ion drag air flow meters have quick response times and can respond to non-laminar air flow. However, previous designs of ion drag air flow meters have generally been disfavored over "hot wire" air flow meters, even with the noted advantages, because ion drag air flow meters have issues including stability, accuracy, insufficient dynamic range, complexity and cost that are not present in "hot wire" air flow meters.

BRIEF SUMMARY OF THE INVENTION

In overcoming the drawbacks and other limitations of the related art, the present invention provides an improved ion drag air flow meter. The air flow meter includes a tube having an exterior surface and an interior surface, which defines an interior space. A collector is disposed within the interior space of the tube and a plurality of transmission pins protrude from the interior surface of the tube, each of the plurality of transmission pins having a tip. The plurality of transmission pins are configured to create ions when a voltage from a high voltage power supply is applied to the plurality of transmission pins. The collector is configured to collect the ions created by the plurality of transmission pins and output a collector signal. The air flow meter may also include a second collector disposed within the interior space of the tube. Like the first collector, the second collector is configured to collect the ions created by the plurality of transmission pins and output a second collector signal. The collector signals outputted by the collectors are independent signals. When the plurality of transmission pins are placed between the collectors, the air flow meter becomes a bi-directional air flow meter. The transmission pins are not directed toward the collectors, but are directed toward the interior space of the tube. This configuration more uniformly fills the interior space with ions allowing the air meter to respond to non-laminar air flow.

The air flow meter may also include an output system configured to receive the first and second collector signals and output an air meter output signal. This air meter output signal is essentially an average of the two collector signals after one of the collector signals is inverted. By averaging the collector signals, one being inverted, noise from a high voltage power supply is partially cancelled. Another benefit is that the two collector signals can be used to control the high voltage power supply. Because the signals from the collectors are inverses of each other (one increases linearly with an increase in air flow while the other decreases linearly) when averaged, the result is nearly constant. This allows an additional feedback circuit to control the high voltage power supply to prevent changes in collector signals due to contamination or saturation.

Further objects, features and advantages of this invention will become readily apparent to persons skilled in the art after a review of the following description, with reference to the drawings and claims that are appended to and form a part of this specification.

DETAILED DESCRIPTION OF THE INVENTION

Figure 1:
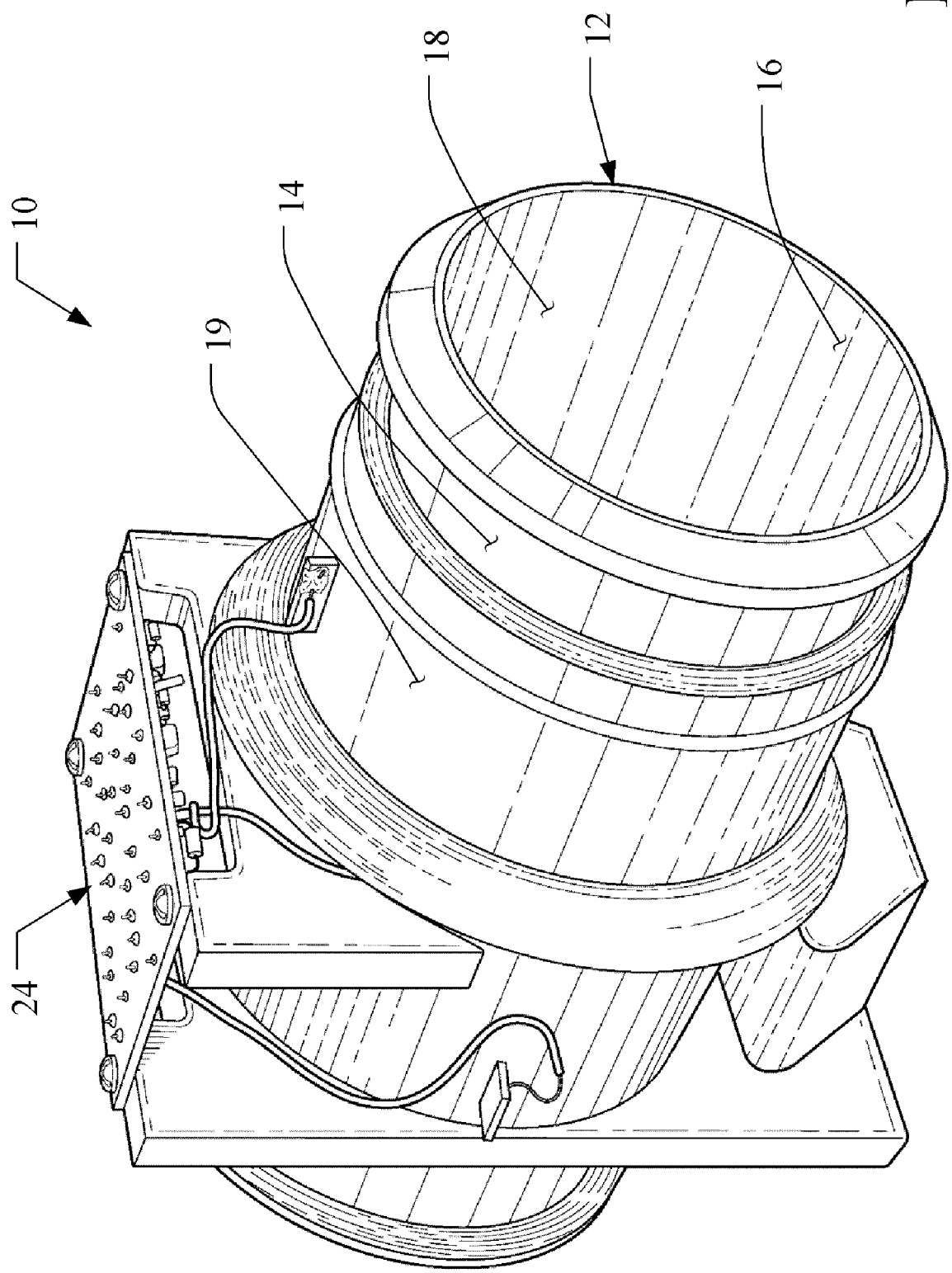
FIG. 1 is a perspective view of an air flow meter embodying the principles of the present invention.
Figure 2:
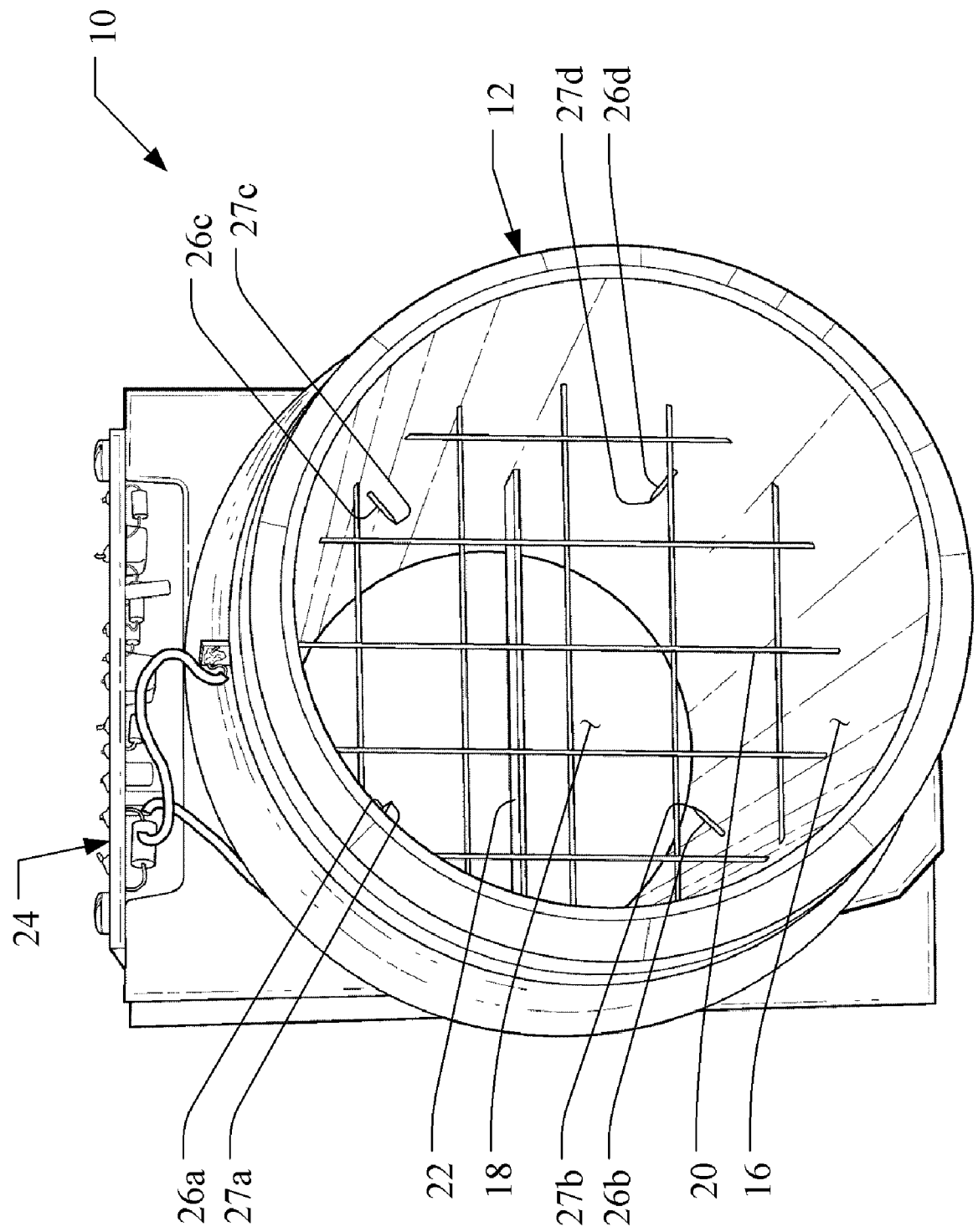
FIG. 2 is another perspective view of the air flow meter of FIG. 1.
Figure 3:
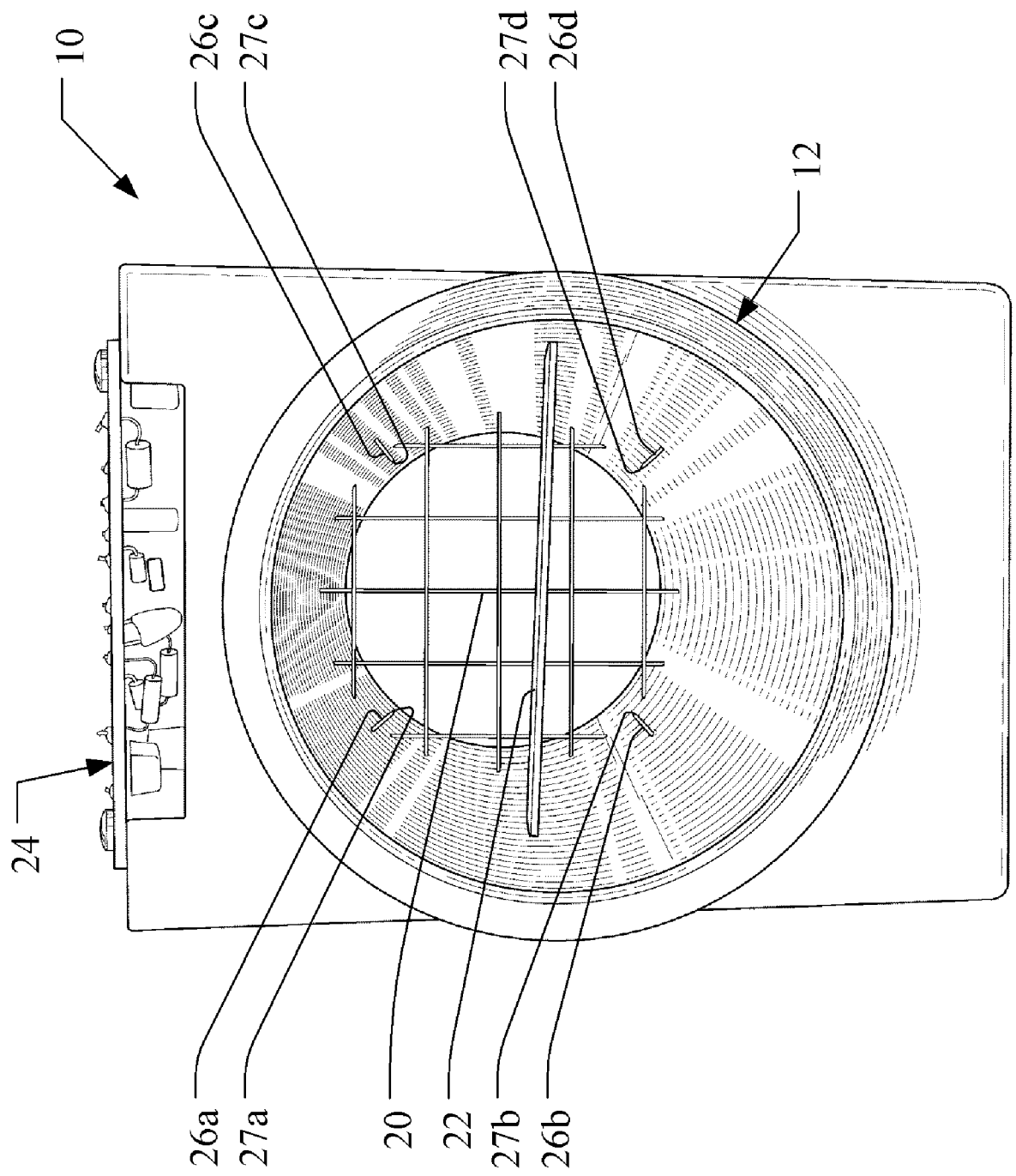
FIG. 3 is rear view of the air flow meter of FIG. 1.

Referring to FIGS. 1, 2, and 3, an airflow meter 10 is shown. The air flow meter 10 generally includes a tube 12 having an exterior surface 14 and an interior surface 16 generally defining an interior space 18. An electrically grounded metallic layer 19 is coupled to the exterior surface 14 of the tube 12. This electrically grounded metallic layer 19 provides a more stable environment for the charged ions that are within the interior space 18 of the air flow meter 10.

A first collector 20 and a second collector 22 are disposed within the interior space 18. The first and second collectors 20 and 22 can be collector bars capable of collecting ions. However, one or both of the first and second collectors 20 and 22 may be a mesh, such as first collector 20. As the collectors 20 and 22 collect ions, the collectors 20 and 22 output a first collector signal and a second collector signal, respectively. The first and second collector signals are independent, each representative of the air flow through the air flow meter 10, and are outputted to a control system 24, which may be located adjacent to the exterior surface 14 of the air flow meter 10. A further description of the control system 24 will be described later in this detailed description section.

As stated previously, the first and second collectors 20 and 22 are capable of collecting ions and outputting signals indicative of the amount of ions collected by each collector. The transmission pins 26A-26D each have tips 27A-27D, respectively. These ions are generated by a plurality of transmission pins 26A-26D that protrude from the interior surface 16 of the tube 12. Generally, these transmission pins 26A-26D protrude from the interior surface 16 of the tube 12 between the first collector 20 and second collector 22. The tips 27A-27D of the plurality of transmission pins 26A-26D substantially point to a center point of the interior space 18. Additionally, the tips 27A-27D of the plurality of transmission pins are 26A-26D generally equally spaced along a diameter of the tube 12.

Figure 4:
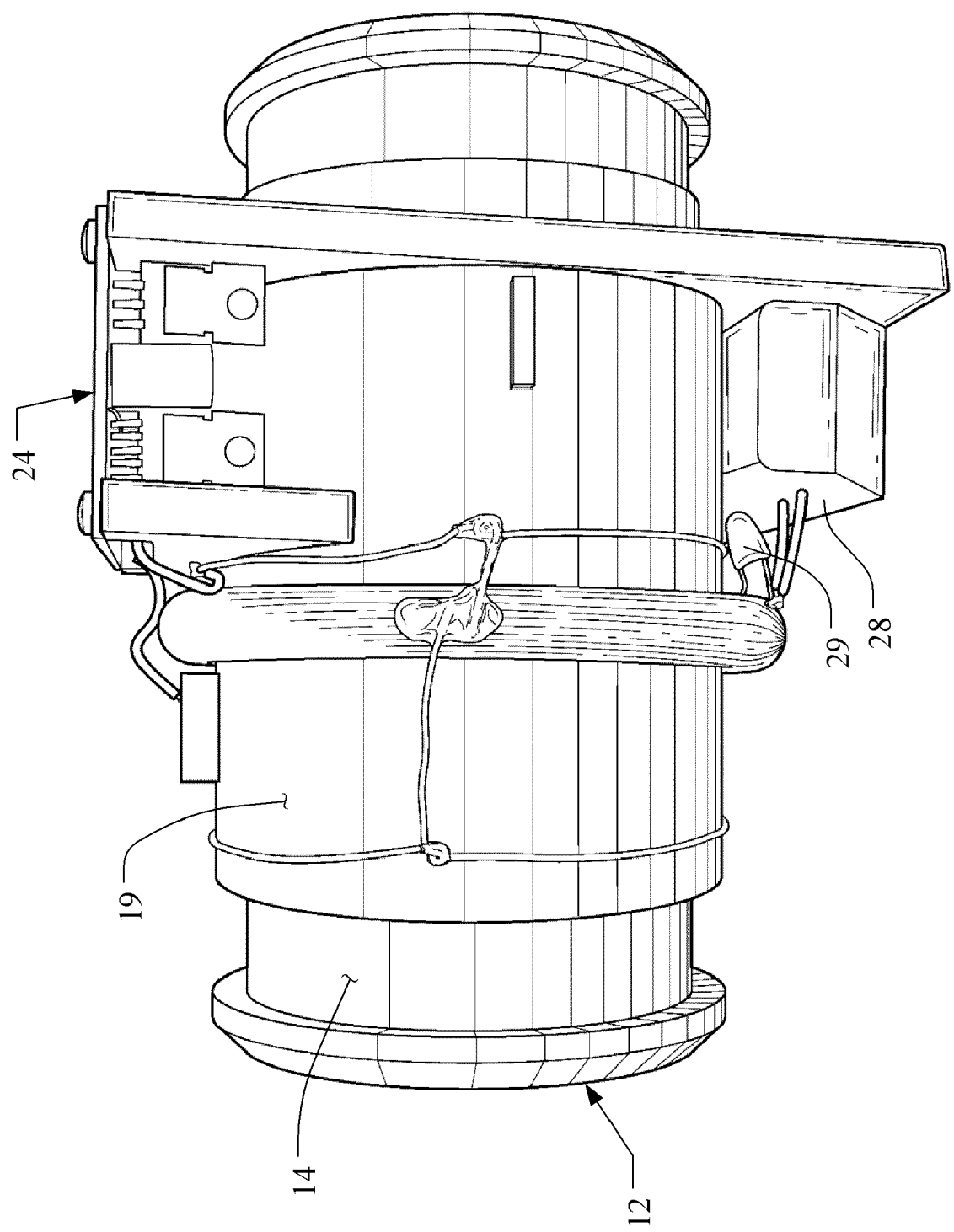
FIG. 4 is side view of the air flow meter of FIG. 1.

The plurality of transmission pins 26A-26D are connected to a high voltage power supply 28, shown in FIG. 4, which acts as an ion generator. Additionally, the high voltage power supply 28 may be electrically coupled to a charge holding capacitor 29, so as to provide a stable voltage to the plurality of transmission pins 26A-26D.

If the collectors 20 and 22 are collector bars, the widths of the first and second collectors 20 and 22 are approximately 5 millimeters to approximately 30 millimeters.

Figure 6:
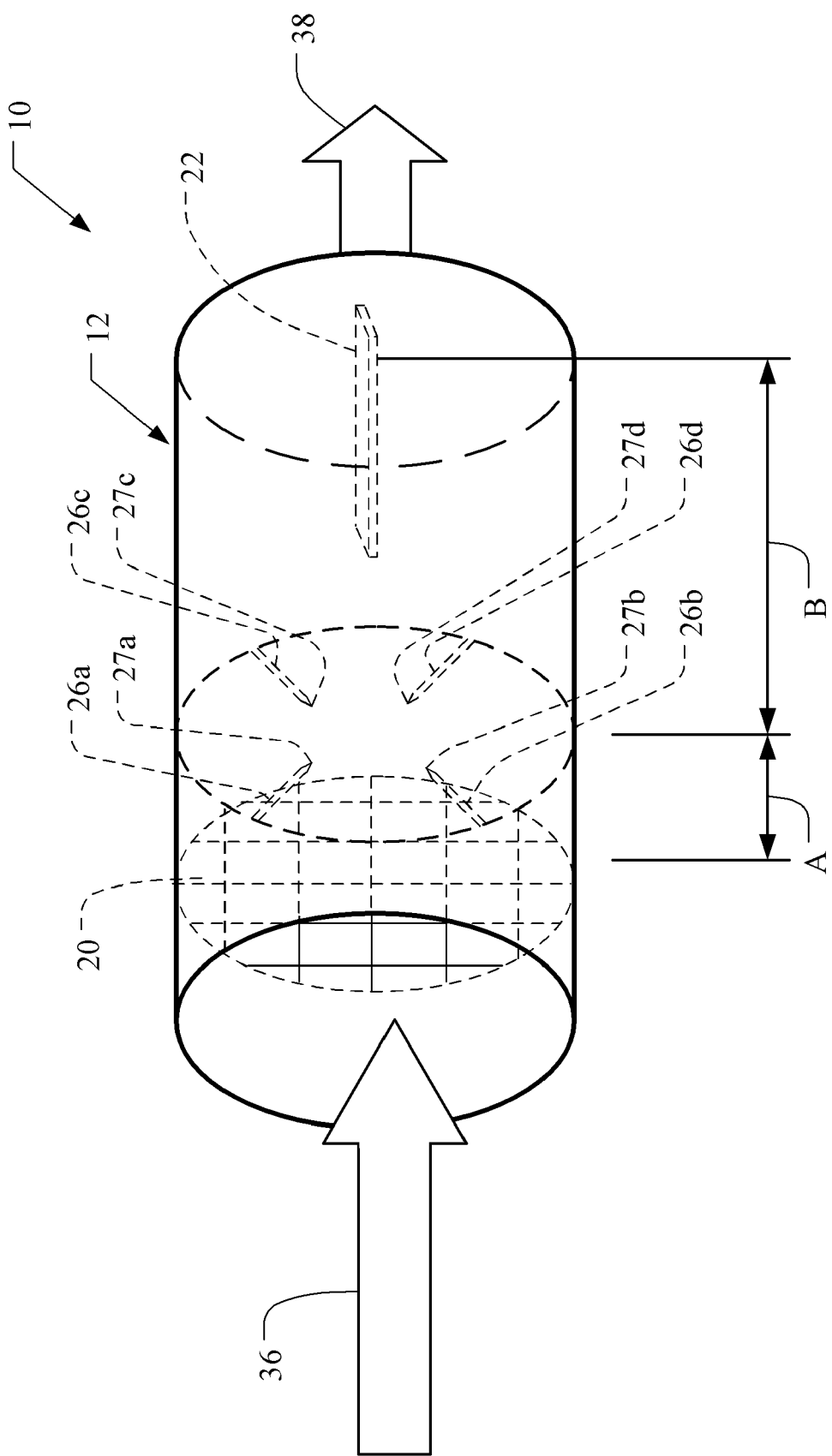
FIG. 6 is a diagrammatic view of an air flow meter detailing the distances between the collectors and the transmission pins.

Referring to FIG. 6, a diagrammatic view of the air flow meter 10 is shown. The distances A and B from the tips 27A-27D of the plurality of transmission pins 26A-26D to the first and second collectors 20 and 22 may be substantially equal. However, in this embodiment, the distances A and B from the tips 27A-27D of the plurality of transmission pins 26A-26D to the first and second collectors 20 and 22 are not equal. By changing the distances A and B, the dynamic range of the air flow meter 10 can be varied.

As it is well known in the art, when the distances A and B are equal, the air flow meter 10 may not have a sufficient dynamic range. The air flow meter 10 may saturate with ions too early as air flow increases. The dynamic range of the air flow meter 10 can be extended by having the collectors 20 and 22 at different distances from the tips 27A-27D of the transmission pins 26A-26D. If the first collector 20 is closer to the tips 27A-27D of the transmission pins 26A-26D than the second collector 22, the dynamic range of the air flow meter 10 is extended. The dynamic range of the air flow meter 10 can be even further extended by utilizing the fact that air flowing past the transmission pin tips also increases the flow of ions. This is explained later in the document.

A typical configuration is to have the first collector bar 20 approximately 10 millimeters from the tips 27A-27D of the transmission pins 26A-26D while the second collector 22 is approximately 30 millimeters away from the tips 27A-27D of the transmission pins 26A-26D. With this configuration, approximately 80% of the dynamic range of each of the signals outputted by the first and second collectors 20 and 22 is responsive to air flow in the principle direction (as indicated by arrows 36 and 38) of the meter, while approximately 20% of the responsiveness is to the air flow in the reverse direction. The percentage of forward and reverse responsiveness is set by the distances A and B between the collectors 20 and 22 and the transmission pins 26A-26D.

Figure 5:
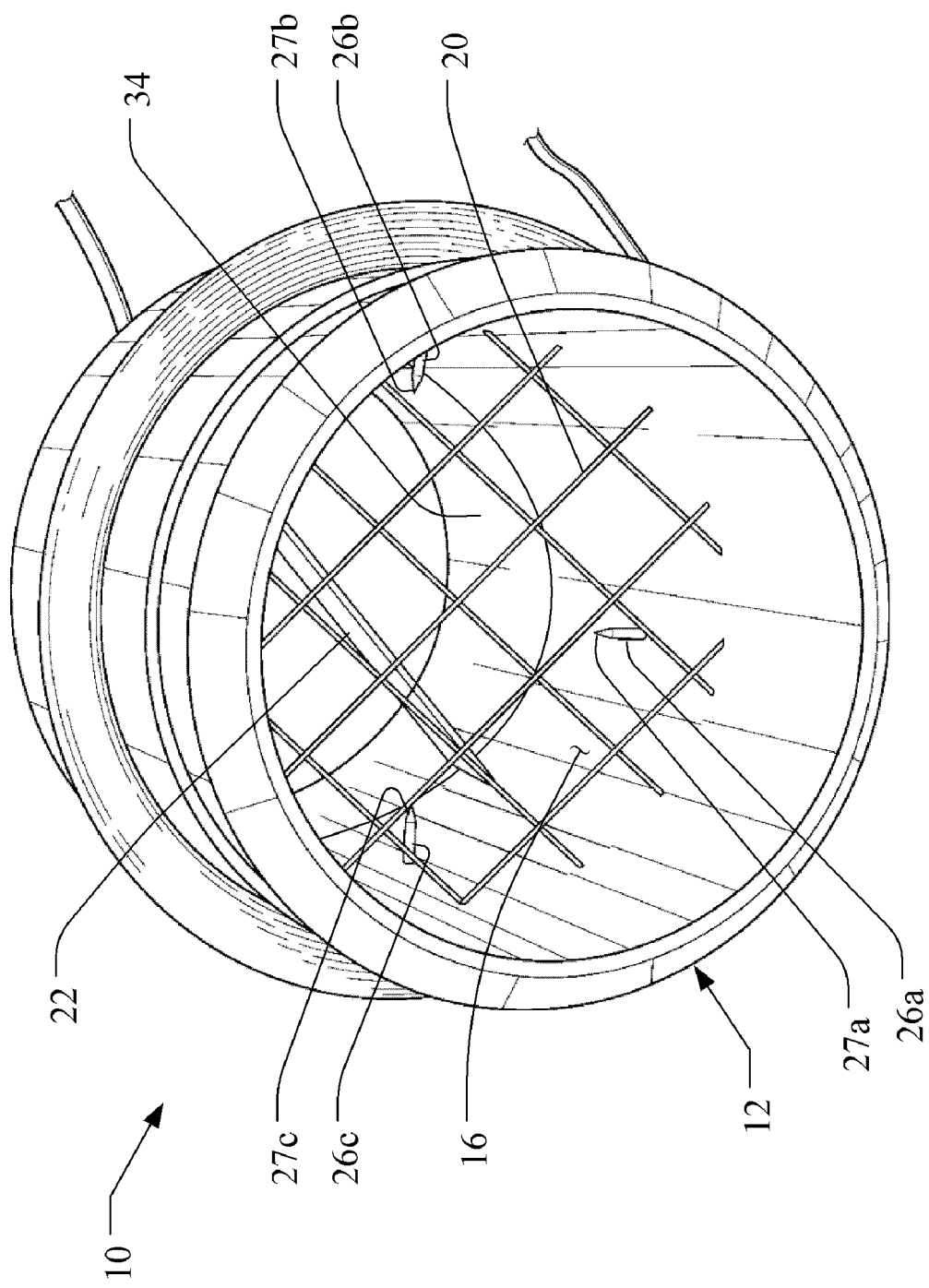
FIG. 5 is a perspective view of an air flow meter having a metallic band coupled to a collector bar.

Referring to FIG. 5, the interior surface 16 may optionally include a metallic band 34. The metallic band 34 is individually and electrically connected to the first collector 20 and second collector 22, respectively. Adding the metallic band 34 increases the effective ground plane thus increasing the flow of ions. The increased ion flow increases the dynamic range of the air flow meter for given distances of dimensions A and B. However, if the collectors 20 and 22 are a mesh and not a collector bar, a metallic band does not need to be utilized, as the metallic band increases the effectiveness of the collector bars, but not collector meshes.

Figure 7:
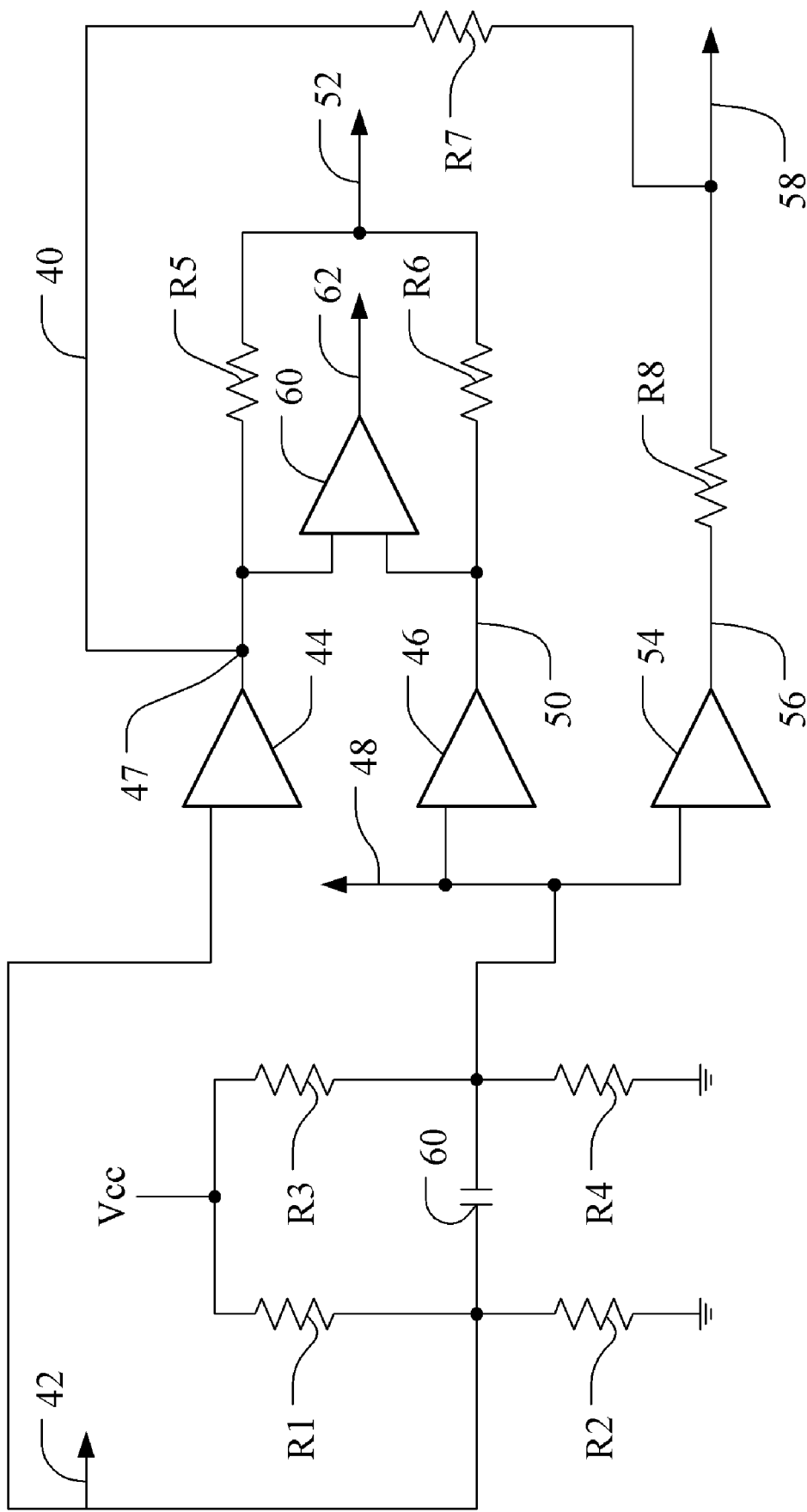
FIG. 7 is a block diagram of output and feedback systems for the air flow meter.

Referring to FIG. 7, an output system 40 for use with the air flow meter 10 of FIGS. 1-6 is shown. The output system 40 is generally embodied using electrical components that are found on the circuit board 24 of FIG. 1. The output system 40 receives the first collector signal 42 and the second collector signal 48. The first collector signal 42 and second collector signal 48 are, as described previously, independent signals originating from the collectors 20 and 22, respectively.

The first collector signal 42 and second collector signal 48 are biased by voltage dividers made from resistors R1-R4. When no air is flowing through the meter 10, the voltage between R1 and R2 should be slightly less than the mid bias point while the voltage between R3 and R4 should be slightly higher than the mid bias point. The difference in voltage is the result of the negatively charged ions that are collected by the two collectors and that the first collector is collecting more ions if dimension A is less than B.

The output system 40 includes an amplifier 44 in communication with the first collector signal 42. The amplifier 44 is configured to amplify the first collector signal 42 to create an amplified first collector signal 47. The output system 40 also includes an amplifier-inverter 46 in communication with the second collector signal 48. The amplifier-inverter 46 is configured to amplify and invert the second collector signal 48 to create an amplified-inverted second collector signal 50. The amplifier 44 and the amplifier-inverter 46 are also in communication with a voltage reference that is generally between 3 to 4 volts.

Using resistors R5 and R6, the output system 40 calculates an average between the amplified first collector signal 47 and the amplified-inverted second collector signal 50 and outputs this average as an air meter output signal 52. The ratio of the resistances of resistors R5 to R6 is determined by the physical spacing of the collection bars to the transmission pins. For example, if the distances A and B of FIG. 6 are 10 millimeters and 30 millimeters, respectively, then R6 should have a value 30% greater than R5 if that air meter is configured for a dynamic range of approximately 150 SCFM. If the air meter is configured to extend the dynamic range to approximately 300 SCFM, then R6 should have a value 5% greater than R5.

It is important to note that the air meter output signal 52 is an average and not the difference between the first and second collector signals 42 and 44. There are several benefits for calculating an average, as opposed to a difference, between the two signals. For example, noise from the high voltage power supply 28 is common to both the first and second collector signals 42 and 44. Because the amplification circuits invert one of the two collector signals, the noise from the high voltage power supply 28 is partially cancelled when the two signals are averaged. Cost and complexity also decrease when the signals are processed as two independent signals that are averaged after amplification. Circuitry to average the independent signals is simple while calculating the difference then amplifying a single signal involves complex circuitry.

Next, when using the collectors, each collector 20 and 22 can respond slightly differently to non-laminar air flow. The combined average signal of from the two collectors 20 and 22 is more representative of the actual air flow than the output from just one of the collectors.

Another benefit is that the output of the two collector signals, feedback signal 58, can be used to control the high voltage power supply 28. Because the signals from the collectors 20 and 22 are inverses of each other (one increases linearly with an increase in air flow while the other decreases linearly) when averaged, the result is nearly constant. This allows a feedback system, as will be described below, to control the high voltage power supply 28.

Still referring to FIG. 7, the first voltage feedback system includes the previously mentioned amplifier 44 which amplifies the first collector signal 42 to create the amplified first collector signal 47. In addition, a second amplifier 54 is in communication with the second collector signal 48 and is configured to amplify the second collector signal 48 to create an amplified second collector signal 56. The first feedback system is configured, using resistors R7 and R8, to calculate an average between the amplified first collector signal 47 and the amplified second collector signal 56 to output the first feedback signal 58. The second amplifier 54 is also in communication with a voltage reference that is generally between 3 to 4 volts. The feedback signal 58 is then outputted to a control system for the high voltage power supply 28 of FIG. 4. Averaging these signals yields a constant output if the supply of ions is constant. If the supply of ions changes, then the average of the two signals also changes and this can generate a feedback signal to restore the supply of ions, thus improving performance against aging and contamination.

As mentioned earlier, air flowing past the tips 27A-27D of the transmission pin 26A-26D increases the flow of ions. If the above feedback system that is designed to provide a constant supply of ions is limited in range to reduce ions, then with near maximum expected air flow, the ions collected by the second collector 22 increase. Limiting the range of the feedback system to reduce ions can be accomplished by allowing amplifiers 44 and or 54 to saturate at near maximum air flow. The increased ions collected by the second collector properly signals the increased air flow through the air flow meter 10 thus further increasing the dynamic range of the air flow meter 10. The range of the feedback circuit to increase ions does not have to be limited and this is the more useful condition as the air flow meter 10 ages.

Much of the signal noise that is generated within the air flow meter 10 is common to the first collector 20 and second collector 22. Since the first collector 20 is connected to an amplifier 44 and the second collector 22 is connected to an amplifier-inverter 46, then much of the signal noise can be minimized by a filter capacitor 60 that is connected between the first collector 20 and second collector 22. This filter capacitor 60 is effective in reducing noise but has less impact on system response time than equal size capacitors from the collectors to ground. A circuit that reduces noise while maintaining response time is a very desirable.

Still Referring to 7, a second feedback circuit can be constructed using these same two collector signals 42 and 48. If one of the signals, in this example one from the second collector 22, is inverted then the signal from collector 20 and the inverted signal from collector 22 should ideally be equal. Any difference between the actual signals represents an imbalance in the ion field within the interior space 18 of the air flow meter 10. This difference signal, as described below, can be amplified and also used to control the high voltage power supply 28. Either of the two feedback signals can be used exclusively or in combination. Used together they offer the best control of the ion field which is critical to the success of air flow meter 10.

The second voltage feedback system also includes amplifier 44, signal 42, and the amplified first collector signal 47. In addition, it includes the previously mentioned amplifier-inverter 46, which amplifies and inverts the second collector signal 48 to create the amplified-inverted second collector signal 50. Signal 47 and signal 50 are compared with a comparator 62 to create a second feedback signal 64. The second feedback signal 64 is a high state (high voltage) or low state (low voltage) two mode signal that represents the direction of imbalance between signals 47 and 50.

When signals 47 and 50 are equal, the comparator 62 toggles between the high and low states at an approximate 50% duty cycle. This second feedback signal 64 is then outputted to a control system for the high voltage power supply 28 of FIG. 4. The two feedback signals 58 and 64 work in concert to control the high voltage supply thereby maintaining a balanced and constant field of ions within the interior space 18 of the air flow meter 10. The second feedback loop working with the first feedback loop, ensures that the sum of the currents through the collectors 20 and 22, resulting from the flow of ions, is constant. This is especially important when transient air flows through the meter 10. Air meter accuracy is improved during transient air flow if the total current through the collectors is constant.

Figure 8:
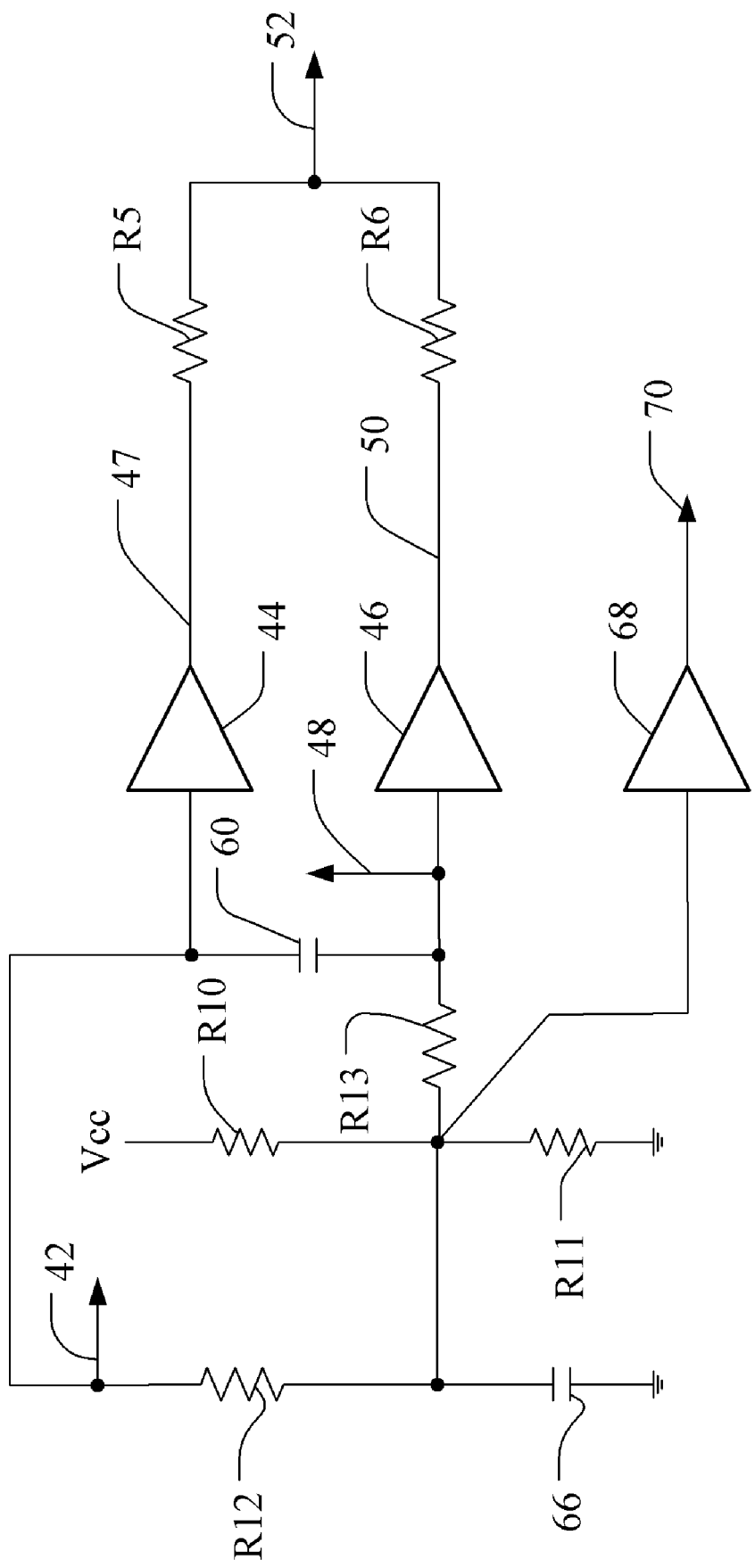
FIG. 8 is a block diagram of another embodiment of output and feedback systems for the air flow meter.

Referring to FIG. 8, another feedback system is shown. Common elements between FIGS. 7 and 8 are identified by like reference numbers and a description of those common elements has been provided previously. This feedback system can be facilitated by replacing the four bias resistors described above and shown in FIG. 7 with resistors R10 and R11 providing the bias to both the first collector signal 42 through resistor R12 and the second collector signal 48 through R13. In this alternative bias configuration, capacitor 66 is in communication with the junction of R10 and R11, and a ground. Capacitor 66 serves to reduce alternating current from the first collector signal 42 that influences the second collector signal 48 and vice versa. The direct current ion current collected by the first collector plus the direct current ion current from the second collector flow through resistor R11, making R11 a common resistor. The voltage across resistor R11 therefore is proportional to the total ion current.

An amplifier 68 is in communication with the voltage across resistor R11 and amplifies it creating signal 70. The amplifier 68 is also in communication with a voltage reference that is generally between 3 to 4 volts. Signal 70 can be used independently to control the high voltage power supply 28. Additionally, this configuration can be used with signals 58 and/or 64 of the feedback system shown in FIG. 7.

The alternative bias resistor configuration R10 and R11 with R12 and R13, shown in FIG. 8, can be use with all three voltage feedback systems which produce signals 58, 64 and 70, respectively. The bias resistor configuration R1, R2, R3 and R4 shown in FIG. 7 only supports the first two voltage feedback systems which produce signals 58 and 64.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

The invention claimed is:

1. An air flow meter, the air flow meter comprising:
   a tube having an exterior surface and an interior surface, the interior surface defining an interior space;
   a first collector disposed within the interior space of the tube;
   a second collector disposed within the interior space of the tube;
   a plurality of transmission pins protruding from the interior surface of the tube between the first and second collectors, each of the plurality of transmission pins having a tip; and
   wherein the plurality of transmission pins are configured to create ions when a voltage from a high voltage power supply is applied to the plurality of transmission pins, wherein the first and second collectors are configured to collect the ions created by the plurality of transmission pins and output first and second collector signals;
   a first amplifier in communication with the first collector signal, wherein the first amplifier is configured to amplify the first collector signal to create an amplified first collector signal;
   an amplifier-inverter in communication with the second collector signal, wherein the amplifier-inverter is configured to amplify and invert the second collector signal to create an amplified-inverted second collector signal; and
   a comparator in communication with the first amplified collector signal and the amplified-inverted second collector signal, wherein the comparator outputs a first feedback signal wherein the air meter output signal reflects the imbalance in magnitude of the first amplified collector signal and the amplified-inverted second collector signal.

2. The air flow meter of claim 1, wherein:
   the first collector is a first collection bar and the second collector is a second collection bar, the first and second collections bars each define a plane;
   the first and second collections bars are orientated within the interior space such that the planes defined by the first and second collection bars are substantially perpendicular.

3. The air flow meter of claim 2, wherein the widths of the first and second collector bars are approximately 5 millimeters to approximately 30 millimeters.

4. The air flow meter of claim 1, further comprising an electrically grounded layer coupled to the exterior surface of the tube.

5. The air flow meter of claim 1, further comprising a first electrically conductive band coupled to the interior surface of the tube, the electrically conductive band being in electrical communication with the first collector.

6. The air flow meter of claim 1, wherein the high voltage power supply in communication with the plurality of transmission pins, whereby the high voltage power supply acts as an ion generator.

7. The air flow meter of claim 1, further comprising a charge holding capacitor in communication with the high voltage power supply for holding a high voltage charge.

8. The air flow meter of claim 1, wherein the tips of the plurality of transmission pins substantially point to a center point of the interior space.

9. The air flow meter of claim 8, wherein the tips of the plurality of transmission pins are equally spaced along the diameter of the tube.

10. The air flow meter of claim 1, wherein the distances from the tips of the plurality of transmission pins to the first and second collectors are substantially equal.

11. The air flow meter of claim 1, wherein the distance from the tips of the plurality of transmission pins to the first collector is less than the distance from the tips of the plurality of transmission pins to the second collector.

12. The air flow meter of claim 11, wherein the first collector signal is attenuated or that the second collector signal is increased such that an incremental change in the first collector signal is equal in magnitude to the change in the second collector signal.

13. The air flow meter of claim 1, further comprising an output system configured to receive the first and second collector signals and output an air meter output signal.

14. The air flow meter of claim 13, wherein the output system is configured to calculate an average between the amplified first collector signal and the amplified-inverted second collector signal and output the average as the air meter output signal.

15. The air flow meter of claim 1, further comprising a voltage feedback system in communication with the high voltage power supply.

16. The air flow meter of claim 1, wherein the voltage feedback system further comprises:
   a second amplifier in communication with the second collector signal, wherein the second amplifier is configured to amplify the second collector signal to create an amplified second collector signal; and
   a feedback system being configured to calculate an average between the amplified first collector signal and the amplified second collector signal and use the average signal as a means to control the output of the high voltage power supply.

17. The air flow meter of claim 1, wherein the voltage feedback system is configured to:
   increase ions produced by the high voltage power supply to maintain a constant supply of ions;
   decrease ions produced by the high voltage power supply; and
   when a near maximum air flow condition through the air flow meter occurs, allow the air flow to generate additional ions that are collected by the second collector.

18. The air flow system of claim 1, wherein at least one of the first and second collectors is a mesh.

19. The air flow meter of claim 1, further comprising:
   a plurality of resistors having a common resistor, the plurality of resistors for biasing the first and second collector signals, wherein the common resistor is common to both the first and second collector signals, wherein current from both the first and second collectors flow through the common resistor; and
   a second amplifier in communication with the common resistor, wherein second amplifier outputs a common amplified voltage, wherein the common amplified voltage can be used as a means to control the output of the high voltage power supply.

20. An air flow meter, the air flow meter comprising:
   a tube having an exterior surface and an interior surface, the interior surface defining an interior space;
   a first collector disposed within the interior space of the tube;
   a second collector disposed within the interior space of the tube;

a plurality of transmission pins protruding from the interior surface of the tube between the first and second collectors, each of the plurality of transmission pins having a tip; and wherein the plurality of transmission pins are configured to create ions when a voltage from a high voltage power supply is applied to the plurality of transmission pins, wherein the first and second collectors are configured to collect the ions created by the plurality of transmission pins and output first and second collector signals;

a first amplifier in communication with the first collector signal, wherein the first amplifier is configured to amplify the first collector signal to create an amplified first collector signal;

an amplifier-inverter in communication with the second collector signal, wherein the amplifier-inverter is configured to amplify and invert the second collector signal to create an amplified-inverted second collector signal; and a plurality of resistors having a common resistor, the plurality of resistors for biasing the first and second collector signals, wherein the common resistor is common to both the first and second collector signals, wherein current from both the first and second collectors flow through the common resistor; and a second amplifier in communication with the common resistor, wherein second amplifier outputs a common amplified voltage, wherein the common amplified voltage can be used as a means to control the output of the high voltage power supply.

21. The air flow meter of claim 20, further comprising:

a first electrically conductive band coupled to the interior surface of the tube, the first electrically conductive band being in electrical communication with the first collector; and a second electrically conductive band coupled to the interior surface of the tube, the second electrically conductive band being in electrical communication with the second collector.

22. The air flow meter of claim 20, wherein:

the first collector is a first collection bar and the second collector is a second collection bar, the first and second collections bars each define a plane;

the first and second collections bars are orientated within the interior space such that the planes defined by the first and second collection bars are substantially perpendicular.

23. The air flow meter of claim 22, wherein the widths of the first and second collector bars are approximately 5 millimeters to approximately 30 millimeters.

24. The air flow meter of claim 20, wherein the high voltage power supply in communication with the plurality of transmission pins, whereby the high voltage power supply acts as an ion generator.

25. The air flow meter of claim 20, further comprising a charge holding capacitor in communication with the high voltage power supply for holding a high voltage charge.

26. The air flow meter of claim 20, wherein the tips of the plurality of transmission pins substantially point to a center point of the interior space.

27. The air flow meter of claim 26, wherein the tips of the plurality of transmission pins are equally spaced along the diameter of the tube.

28. The air flow meter of claim 20, wherein the distances from the tips of the plurality of transmission pins to the first and second collectors are substantially equal.

29. The air flow meter of claim 20, wherein the distance from the tips of the plurality of transmission pins to the first collector is less than the distance from the tips of the plurality of transmission pins to the second collector.

30. The air flow meter of claim 29, wherein the first collector signal is attenuated or that the second collector signal is increased such that an incremental change in the first collector signal is equal in magnitude to the change in the second collector signal.

31. The air flow meter of claim 20, wherein the voltage feedback system is configured to:

increase ions produced by the high voltage power supply to maintain a constant supply of ions;

decrease ions produced by the high voltage power supply; and when a near maximum air flow condition through the air flow meter occurs, allow the air flow to generate additional ions that are collected by the second collector.

32. The air flow meter of claim 20, wherein at least one of the first and second collectors is a mesh.

33. The air flow meter of claim 20, further comprising an electrically grounded layer coupled to the exterior surface of the tube.

34. The air flow meter of claim 20, further comprising an output system configured to receive the first and second collector signals and output an air meter output signal.

35. The air flow meter of claim 34, wherein the output system is configured to calculate an average between the amplified first collector signal and the amplified-inverted second collector signal and output the average as the air meter output signal.

* * * * *